Figure 1:
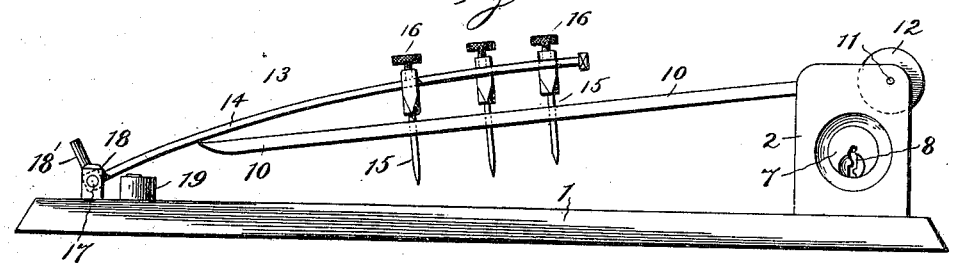

No. 709,240. Patented Sept. 16, 1902.
E. S. PHELPS.
GAGE FOR MEASURING KEYS FOR PIN TUMBLER LOCKS.
(Application filed June 10, 1901.)
(No Model.) 2 Sheets—Sheet 1.

WITNESSES:
Jas. E. Hutchinson.

INVENTOR
Edwin S. Phelps,
by his Attorney

THE NORRIS PETERS CO., PHOTO-LITHO., WASHINGTON, D. C.

No. 709,240. Patented Sept. 16, 1902.
E. S. PHELPS.
GAGE FOR MEASURING KEYS FOR PIN TUMBLER LOCKS.
(Application filed June 10, 1901.)
(No Model.)
2 Sheets—Sheet 2.
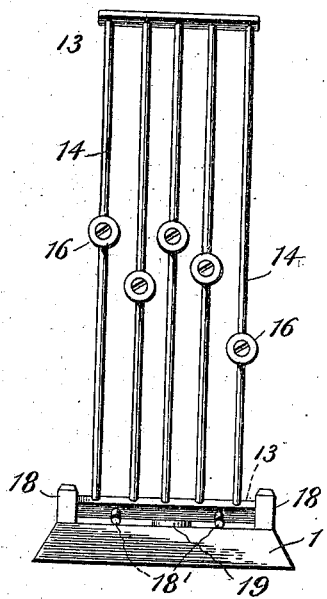
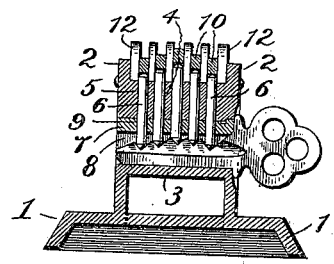
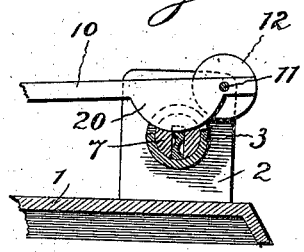
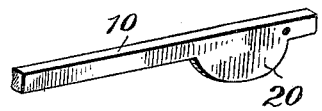
WITNESSES
Jas. E. Hutchinson.
INVENTOR
Edwin S. Phelps
by _____, Attorney
THE NORRIS PETERS CO., PHOTO-LITHO., WASHINGTON, D. C.

UNITED STATES PATENT OFFICE.

EDWIN SANFORD PHELPS, OF NEW YORK, N. Y.

GAGE FOR MEASURING KEYS FOR PIN-TUMBLER LOCKS.

SPECIFICATION forming part of Letters Patent No. 709,240, dated September 16, 1902.

Application filed June 10, 1901. Serial No. 63,943. (No model.)

*To all whom it may concern:*

Be it known that I, EDWIN SANFORD PHELPS, a citizen of the United States, residing in New York, in the county of New York and State of New York, have invented certain new and useful Improvements in Gages for Measuring Keys for Pin-Tumbler Locks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a gage for use in making keys for locks, the object being to insure accuracy in filing or cutting a key to conform to a pattern-key and to indicate by the gage when the duplicate key is in substantial accord with the pattern-key, and if any substantial difference exists to indicate by the gage the difference and its location, so that it may be rectified in order to make the duplicate key conform in all respects with the pattern-key.

To the accomplishment of the foregoing and such other objects as may hereinafter appear, the invention consists, primarily, in a device comprising one or more movable index-fingers corresponding in number to the pin-tumblers designed to be operated and adapted to move to an extent determined by the projection of the pin-tumblers, and a scale whose marking indicates the position which the fingers should bear in relation thereto when the tumbler configuration of the key being formed conforms to the tumbler configuration of the pattern-key.

It further comprises one or more index-fingers such as before mentioned, and a scale containing a number of pointers adjustable to points with which the movable fingers should register when the key being formed corresponds to the tumbler configuration of the pattern-key, any difference between the tumbler configuration of the key being made and that of the pattern-key being indicated by the finger or fingers and pointer or pointers out of register with each other.

It further comprises one or more index-fingers movable by pin-tumblers actuated by a key and a scale marked to indicate what the extent of movement of the index finger or fingers should be when the tumbler configuration of the key being made conforms to that of the pattern-key, any difference in the tumbler configuration of the two keys being multiplied in its indication upon the scale, so that slight differences will be readily discernible; and it further comprises features of construction and combination, all of which will be hereinafter particularly described and then sought to be clearly defined by the claims, reference being had to the accompanying drawings, forming a part hereof, and in which—

Figure 2:
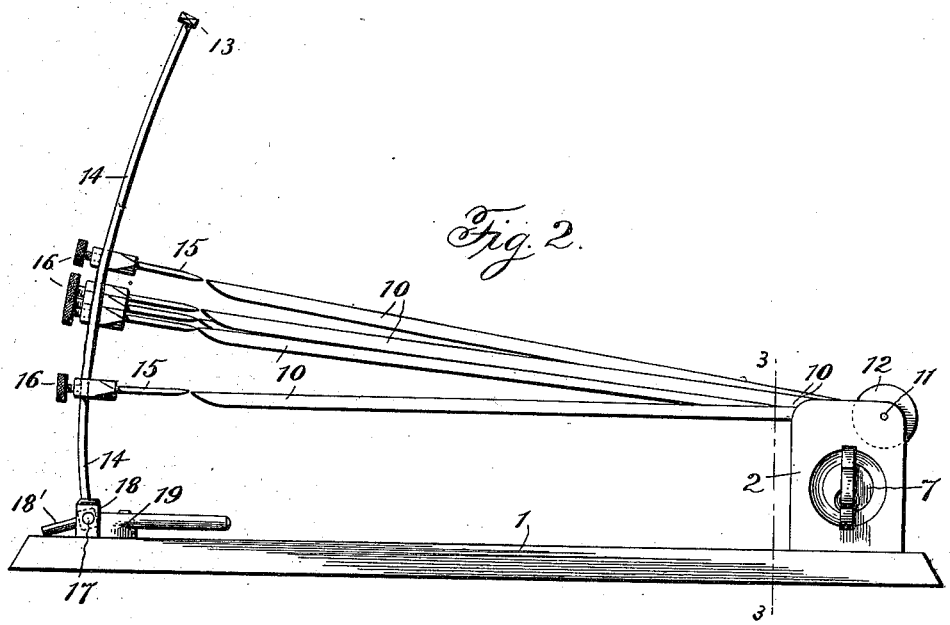
Figure 3:
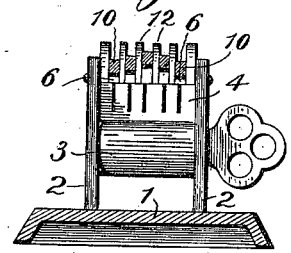

Figure 1 is a side elevation of the gage with the parts folded; Fig. 2, a side elevation showing the parts in operative position with a key inserted in the lock-barrel; Fig. 3, a vertical cross-section on the line 3 3 of Fig. 2. Fig. 4 is an end of the rack elevated; Fig. 5, a vertical cross-section through Fig. 3; Fig. 6, a vertical longitudinal section of another form with parts broken away and showing a key in the lock-barrel; and Fig. 7, a perspective of a portion of one of the fingers, showing a depending knife-edged blade on an enlarged scale.

In the drawings the numeral 1 designates a base provided at one end with the standards 2, between which is the cylinder 3, designed to receive the lock-barrel and provided with the web 4, in which are formed the sockets 5 to receive pin-tumblers 6. The cylinder 3 and its web and sockets and pin-tumblers may be of the ordinary construction employed in pin-tumbler locks, or the tumblers may each be in one piece and of the same length, as indicated in the drawings. The cylinder 3 receives a lock-barrel 7, the key-slot 8 in which will in cross-section conform to the cross-section shape of the key designed for the make of the lock with which it is to be used, said barrel being formed with the holes 9, designed to receive the lower ends of the pin-tumblers, as usual in pin-tumbler locks. It is obvious that upon the insertion of a key into the slot of the barrel the pin-tumblers will be raised by contact of the key with their lower ends and that the extent to which the tumblers will be projected will depend upon the depth of the cuts in the key, said cuts constituting the tumbler configuration of the key and serving to actuate the tumblers in a lock only when the tumbler configuration conforms to the requisites for that particular lock, the tumblers in my gage, however, being projected according to the configuration imparted by the cuts in the key whatever key be used. The slot in the key-barrel serves as a guide to direct the key beneath the tumblers, so as to actuate the tumblers.

To the standards 2 are pivoted a number of arms or levers 10, which for convenience I will designate as "index-fingers," there being as many of these index-fingers as there are pin-tumblers 6, said fingers being so pivoted that in their normal position they will rest upon the tumblers, one upon each, so that upon inserting a key into the slot of the lock-barrel the tumblers will be raised, and thus lift the index-fingers, the extent of lifting each finger depending upon the extent of projection of the tumblers, which is controlled by the tumbler configuration of the operating-face of the key. These index-fingers may be attached in any suitable manner to have the movement specified, and in the drawings they are illustrated as attached by a pivot-pin 11, which passes through the several fingers and has its bearing in the bracket 2, and the fingers are illustrated as spaced apart by the washers 12. These fingers can be thrown entirely back, so as to permit the withdrawal of the pin-tumblers when a lock-barrel having a different configuration for its key-slot in cross-section is to be substituted for another style of tumbler-lock key. To indicate the extent of movement of the index-fingers, the device is provided with a scale which in the preferred form of the invention consists of a rack 13, the longitudinal members 14 of which are each provided with a pointer 15, adapted to slide on the members and be secured at their adjustments by any suitable means—for instance, by set-screws 16, passing through the shanks of the pointers and bearing against the longitudinal members of the rack, there being as many pointers as there are index-fingers. A pattern-key of a given tumbler configuration being pressed into the key-slot of the lock-barrel will push up or project the pin-tumblers, which, bearing against the index-fingers, will elevate the same, the elevation of the several fingers depending upon the configuration of the tumbler-key. The pointers upon the rack are now adjusted so that they will register with the index-fingers and will be locked in that position, thus forming a scale which will indicate the position in which the fingers should stand in relation to the pointers when a key having the same tumbler-pin configuration as the pattern-key is inserted in the key-slot of the lock-barrel. If the key being cut or filed to conform to the pattern-key should not be filed in substantial conformity with the pattern-key, such key when inserted in the key-slot of the lock-barrel will project the pin-tumblers to an extent depending upon the cut or filing of the key, and the difference between such key and the pattern-key will be indicated upon the scale by one or more of the fingers being out of register with their respective pointers upon the rack and by the fingers out of register with the pointers indicating the particular point in the key which is to be altered to make it conform to the pattern-key. The key will then be removed and further cut or filed to correct the error, and when all the fingers are in register with the pointers on the rack it will be known that the key being made is in substantial conformity in all particulars with the pattern-key. Even though the difference between the pattern-key and the key being made should be exceedingly slight, such difference would be readily discernible, because the index-fingers by reason of their length would magnify or multiply upon the scale the actual difference between the two keys. Whenever a new pattern-key having a different tumbler configuration from the replaced pattern-key is used, the pointers of the scale-rack are adjusted to register with the fingers in their new position imparted by the substitute pattern-key, and the gage then serves for use in making the new set of keys.

The rack 13 is hinged to the base 1 by pintles 17, journaled in studs 18, formed as a part of the base, and the rear lower portion of the rack is provided with stop-pins 18, which will bear against the base 1 when the rack is elevated, so as to prevent the rack from falling backward, and an eccentric lever 19, pivoted to the base, will bear against the front lower portion of the rack when the latter is raised, so as to prevent the rack from falling forward. The rack is curved longitudinally, so as to describe an arc of a circle in order that the ends of the pointers toward the ends of the fingers may always stand at practically the same distance from the ends of the fingers in the various elevations of the fingers for convenience and accuracy in determining when the pointers and the fingers are in exact register with each other.

It will be observed that this gage is not confined in its use to tumbler-keys of any particular maker, as the lock-barrel for one style of key can be removed and replaced by a lock-barrel conforming to a different style of key, and hence the device is adapted for use in connection with different styles of tumbler-locks and keys.

Another form of the invention is illustrated in Figs. 6 and 7 of the drawings, where instead of employing pins made separate from the fingers, as illustrated in Figs. 3 and 5, I may have the pins made in the form of blades 20, depending from the under side of the fingers and passing through suitably-shaped openings in the lock-barrel and its inclosing cylinder, as indicated in Fig. 6 of the drawings, the lower edge of the blades being knife-edged, as illustrated in Fig. 7 of the drawings. In this form the knife-edge of the blades would rest in the several notches of the key and the fingers would be elevated or lowered proportionately to the depth of the cuts in the key, and the principle and effect would be the same as in the first form described, where the pins are made separate from the fingers.

While the construction of gage illustrated and described possesses material features of advantage over other constructions and it is the intent to cover by this application all the novel features contained in the device, yet it is obvious that changes can be made in the details of construction and broad essential features of my invention still be retained.

While the lock-barrel serves as a support for the pattern and also the duplicate key for the actuation of the index-fingers by the key, yet, as hereinbefore indicated, I am not limited to such means, as any means which will permit the key to be applied so as to actuate the fingers will be embraced within the scope of my invention, and accordingly the phrase "means for supporting a key having depressions" is to be so interpreted.

Having described my invention and set forth its merits, what I claim is—

1. A key-gage comprising a number of index-fingers, means for supporting a key, having depressions, in such relation to said fingers as to impart adjustment to said fingers to an extent governed by the depressions in the key, and a scale for indicating the extent of movement of the fingers, the scale being adapted in conjunction with the fingers to indicate in a multiplied ratio differences between the depressions of one key and corresponding depressions of another key, substantially as described.

2. A key-gage comprising a number of index-fingers and parts coöperating therewith to adjust the fingers to an extent determined by depressions in a key, means for supporting a key, having depressions, in such relation to said coöperating parts that said parts will enter the depressions in the key and determine the extent of movement of the index-fingers, and a scale adapted to indicate the extent of movement of the index-fingers, said fingers indicating upon the scale in a multipied ratio differences that may exist between the depressions of one key and corresponding depressions of another key, substantially as described.

3. A key-gage comprising a number of index-fingers, means for supporting a key, having depressions, in such relation to said fingers as to impart adjustment to the fingers to an extent governed by the depressions in the key, and a scale for indicating the extent of movement of the fingers, said scale having parts adjustable to a predetermined normal movement of the index-fingers and in conjunction with the fingers adapted to indicate in a multiplied ratio differences that may exist between the depressions in a key which conform to the normal movement of the fingers and corresponding depressions in a duplicate key that cause an abnormal movement of the fingers, substantially as described.

4. A gage for measuring keys for tumbler-locks, comprising tumblers, movable index-fingers resting upon the tumblers, and a rack provided with pointers adjustable in relation to the index-fingers, substantially as described.

5. A gage for measuring keys for tumbler-locks, comprising a replaceable key-slotted lock-barrel, tumblers adapted to be operated by a key inserted in the slot of the barrel, pivoted index-fingers resting upon the tumblers, and a rack provided with pointers adjustable in relation to the index-fingers, substantially as described.

6. A gage for measuring keys for tumbler-locks, comprising tumblers, movable index-fingers resting upon the tumblers, and a folding rack provided with pointers adjustable in relation to the index-fingers, substantially as described.

7. A gage for measuring keys for tumbler-locks, comprising tumblers, movable index-fingers resting upon the tumblers, and a curved rack provided with pointers adjustable in relation to the index-fingers, substantially described.

8. A gage for measuring keys for tumbler-locks, comprising tumblers, movable index-fingers resting upon the tumblers, a hinged rack provided with pointers adjustable in relation to the index-fingers, and means for locking the rack in an upright position, substantially as described.

9. A gage for measuring keys for tumbler-locks, comprising tumblers, movable index-fingers resting upon the tumblers, a hinged rack provided with pointers adjustable in relation to the index-fingers, stop-pins for checking the movement of the rack in one direction, and an eccentric lever for locking the rack against movement in the opposite direction, substantially as described.

In testimony whereof I affix my signature in presence of two witnesses.

EDWIN SANFORD PHELPS.

Witnesses:
CHAS. W. RIECKS,
F. P. MCGLYNN.